US009905384B2

(12) United States Patent
Liu

(10) Patent No.: US 9,905,384 B2
(45) Date of Patent: Feb. 27, 2018

(54) SYSTEMS AND METHODS FOR QUICK RELEASE ELECTROMAGNETIC RELAYS

(71) Applicant: SCHNEIDER ELECTRIC IT CORPORATION, West Kingston, RI (US)

(72) Inventor: Jidong Liu, Shanghai (CN)

(73) Assignee: SCHNEIDER ELECTRIC IT CORPORATION, West Kingston, RI (US)

(*) Notice: Subject to any disclaimer, the term of this patent is extended or adjusted under 35 U.S.C. 154(b) by 121 days.

(21) Appl. No.: 15/035,639

(22) PCT Filed: Dec. 6, 2013

(86) PCT No.: PCT/CN2013/088767
§ 371 (c)(1),
(2) Date: May 10, 2016

(87) PCT Pub. No.: WO2015/081559
PCT Pub. Date: Jun. 11, 2015

(65) Prior Publication Data
US 2016/0276121 A1  Sep. 22, 2016

(51) Int. Cl.
H01H 47/02 (2006.01)
H01H 47/22 (2006.01)
(Continued)

(52) U.S. Cl.
CPC ........ *H01H 47/226* (2013.01); *H01H 47/001* (2013.01); *H01H 47/24* (2013.01);
(Continued)

(58) Field of Classification Search
CPC .... H01H 47/001; H01H 47/14; H01H 47/226; H01H 47/24; H01H 50/36; H01H 50/42; H01H 50/443
See application file for complete search history.

(56) References Cited

U.S. PATENT DOCUMENTS

| 4,434,450 A | 2/1984 | Gareis |
| 5,049,844 A | 9/1991 | Mustafa |
| 8,125,754 B2 * | 2/2012 | Shvartsman ............... H01F 7/18 361/160 |

FOREIGN PATENT DOCUMENTS

| CN | 103377858 A | 10/2013 |
| DE | 4110411 A1 | 1/1992 |

(Continued)

OTHER PUBLICATIONS

Notification of Transmittal of the International Search Report and the Written Opinion of the International Searching Authority from corresponding PCT/CN2013/088767 dated Aug. 25, 2014.

(Continued)

Primary Examiner — Jeffrey Zweizig
(74) Attorney, Agent, or Firm — Lando & Anastasi, LLP

(57) ABSTRACT

An electromagnetic relay is provided. The electromagnetic relay includes a first port and a second port, a first coil and a second coil, a movable armature coupled between the first port and the second port constructed to connect and disconnect the first port and the second port, a switch circuit, and a coil control circuit. The switch circuit is constructed to connect the first coil to an external power source to induce the first coil to create a first magnetic field having a first direction and disconnect the first coil from the external power source to cause the first magnetic field to collapse. The coil control circuit is constructed to induce the second coil to create a second magnetic field having a second direction responsive to the switch circuit being in the second state, the second direction being opposite the first direction.

20 Claims, 6 Drawing Sheets

(51) Int. Cl.
    *H01H 47/24*     (2006.01)
    *H01H 50/02*     (2006.01)
    *H01H 50/44*     (2006.01)
    *H01H 47/00*     (2006.01)
    *H01H 50/36*     (2006.01)
    *H01H 50/42*     (2006.01)
    *H02J 4/00*     (2006.01)
    *H02J 9/06*     (2006.01)
    *F02N 11/08*     (2006.01)

(52) U.S. Cl.
    CPC .......... *H01H 50/021* (2013.01); *H01H 50/36* (2013.01); *H01H 50/42* (2013.01); *H01H 50/443* (2013.01); *H02J 4/00* (2013.01); *H02J 9/061* (2013.01); *F02N 11/087* (2013.01)

(56) References Cited

FOREIGN PATENT DOCUMENTS

| | | |
|---|---|---|
| DE | 102009028296 A1 | 2/2011 |
| JP | H0877905 A | 3/1996 |
| JP | H10125194 A | 5/1998 |
| WO | 9632734 A1 | 10/1996 |

OTHER PUBLICATIONS

Extended European Search Report from corresponding European Application No. 13898739.1 dated Jun. 1, 2017.

\* cited by examiner

SYSTEMS AND METHODS FOR QUICK RELEASE ELECTROMAGNETIC RELAYS

CROSS-REFERENCE TO RELATED APPLICATIONS

This application is a U.S. National Stage Application under 35 U.S.C. § 371 of International Application No. PCT/CN2013/088767, filed Dec. 6, 2013, titled SYSTEMS AND METHODS FOR QUICK RELEASE ELECTROMAGNETIC RELAYS, which is hereby incorporated herein by reference in its entirety.

BACKGROUND

Technical Field

Embodiments of the present disclosure relate generally to relays. More specifically, embodiments relate to systems and methods for quick release electromagnetic relays.

Background Discussion

Electromagnetic relays are switching devices that may be controlled by a current and/or voltage signal. Electromagnetic relays may connect two electrical contacts responsive to receiving a voltage control signal. The two electrical contacts may be connected and disconnected via a movable armature within the electromagnetic relay. The movable armature may be held in a first state or a second state by a spring. Electromagnetic relays utilize magnetic fields to control the movable armature and thereby change the state of the relay. The magnetic fields may be controlled by a coil. Applying a voltage to, and thereby inducing a current in, the coil creates a magnetic field around the coil. The magnetic field is collapsed by disconnecting the coil from the power source. As the magnetic field collapses, the spring pulls the movable armature back to its original state. The speed at which the electromagnetic relay changes state is dependent upon the rate at which the magnetic field in the coil is created and collapsed.

SUMMARY

According to one aspect, an electromagnetic relay is provided. The electromagnetic relay comprises a first port and a second port, a first coil and a second coil, a movable armature coupled between the first port and the second port, the movable armature having a first state that connects the first port to the second port and a second state that disconnects the first port from the second port, a switch circuit coupled to the first coil, the switch circuit having a first state constructed to connect the first coil to an external power source to induce the first coil to create a first magnetic field having a first direction and a second state constructed to disconnect the first coil from the external power source, and a coil control circuit coupled to the first coil and the second coil and constructed to induce the second coil to create a second magnetic field having a second direction responsive to the switch circuit being in the second state, the second direction being opposite the first direction.

In one embodiment, the electromagnetic relay is constructed such that the first magnetic field attracts the movable armature to move from the first state to the second state and the second magnetic field repels the movable armature to move from the second state to the first state. In another embodiment, further comprises a ferrite core, and wherein the first coil and the second coil are wrapped around a ferrite core.

In one embodiment, the coil control circuit comprises a hall effect sensor constructed to determine the strength of the first magnetic field and the second magnetic field created by the first coil and the second coil respectively. In one embodiment, the coil control circuit further comprises a differential amplifier coupled to the coil control circuit.

In one embodiment, the coil control circuit comprises a microcontroller constructed to determine a characteristic associated with the first coil and induce the second coil to create the second magnetic field. In one embodiment, the coil control circuit further comprises a voltage divider circuit coupled between an input of the microcontroller and the first coil.

In one embodiment, the coil control circuit comprises an optocoupler. In one embodiment, the electromagnetic relay is contained within in an automatic transfer switch (ATS). In one embodiment, the electromagnetic relay is contained within one of an uninterruptable power supply (UPS) and a power distribution unit (PDU).

According to one aspect, a method of operating an electromagnetic relay having a first coil and a second coil is provided. The method comprises connecting the first coil to an external power source to induce the first coil to create a first magnetic field having a first direction, moving a movable armature from a first state to a second state at least in part by the first magnetic field, disconnecting the first coil from the external power source, and inducing the second coil to create a second magnetic field having a second direction opposite the first direction, the second magnetic field releasing the movable armature from the second state back to the first state.

In one embodiment, inducing the second coil to create the second magnetic field includes sensing a combined strength of the first magnetic field and the second magnetic field. In one embodiment, inducing the second coil to create the second magnetic field further includes amplifying a voltage signal output by a hall effect sensor.

In one embodiment, inducing the second coil to create the second magnetic field includes determining a characteristic associated with the first coil. In one embodiment, inducing the second coil to create the second magnetic field includes applying a voltage to the second coil responsive to the determined characteristic associated with the first coil. In one embodiment, inducing the second coil to create the second magnetic field includes controlling a variable resistance coupled to the second coil responsive to the determined voltage value associated with the first coil.

According to one aspect, an electromagnetic relay is provided. The electromagnetic relay comprises a first port and a second port, a first coil and a second coil, a movable armature coupled between the first port and the second port, the movable armature having a first state that connects the first port to the second port and a second state that disconnects the first port from the second port, a switch circuit coupled to the first coil, the switch circuit having a first state constructed to connect the first coil to an external power source to induce the first coil to create a first magnetic field having a first direction and a second state constructed to disconnect the first coil from the external power source, and means, coupled to the first coil and the second coil, for inducing the second coil to create a second magnetic field having a second direction responsive to the switch circuit being in the second state, the second direction being opposite the first direction.

In one embodiment, the means for inducing the second coil to create a second magnetic field includes a hall effect sensor. In another embodiment, the means for inducing the second coil to create a second magnetic field includes a microcontroller. In yet another embodiment, the means for inducing the second coil to create a second magnetic field includes an optocoupler.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed subject matter. Particular references to examples and embodiments, such as "an embodiment," "another embodiment," "some embodiments," "other embodiments," "an alternate embodiment," "various embodiments," "one embodiment," "at least one embodiments," "this and other embodiments" or the like, are not necessarily mutually exclusive and are intended to indicate that a particular feature, structure, or characteristic described in connection with the embodiment or example and may be included in that embodiment or example and other embodiments or examples. The appearances of such terms herein are not necessarily all referring to the same embodiment or example.

Furthermore, in the event of inconsistent usages of terms between this document and documents incorporated herein by reference, the term usage in the incorporated references is supplementary to that of this document; for irreconcilable inconsistencies, the term usage in this document controls. In addition, the accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Some embodiments disclosed herein include electromagnetic relays with quick release capabilities (i.e., quick release electromagnetic relays). In these embodiments, the quick release electromagnetic relays may include a first coil and a second coil wrapped around a common core. The first coil may be constructed to create a magnetic field that attracts the movable armature within the relay, and thereby change the relay from a first state to a second state. The first coil may be connected and disconnected from the external power source via a switch to control the magnetic field generated by the first coil. The quick release electromagnetic relay may create a second magnetic field with an opposite direction relative to the magnetic field generated by the first coil. The total magnetic field acting upon the movable armature is thereby reduced by the second magnetic field. The reduction of the attractive magnetic force on the movable armature expedites the release of the armature from the second state.

Example Electromagnetic Relay

Figure 1:
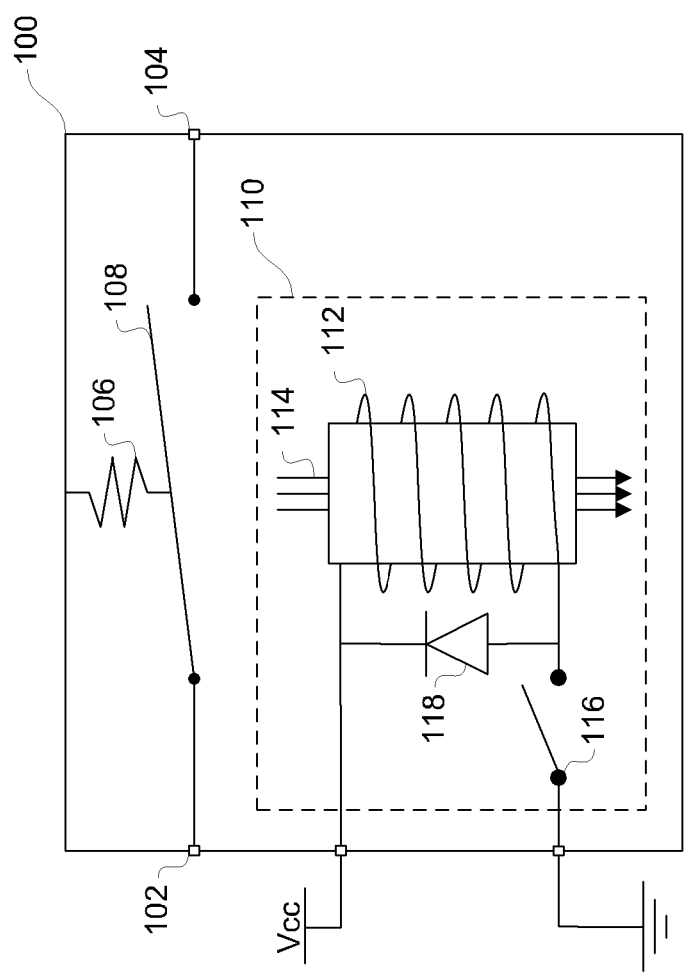
FIG. 1 illustrates an embodiment of a relay.

FIG. 1 illustrates an embodiment of an electromagnetic relay 100. The electromagnetic relay 100 includes a first port 102, a second port 104, a spring 106, a movable armature 108, and a relay drive circuit 110 including a coil 112 that creates a magnetic field 114, a switch 116, and a diode 118.

In one embodiment, the electromagnetic relay 100 controls an electrical connection between the first port 102 with the second port 104. The state of the relay 100 is governed by the position of the movable armature 108. The movable armature 108 is held in an open state by spring 106. The electromagnetic relay employs a magnetic field (e.g., magnetic field 114) to move the movable armature 108 from the open state to a closed state that connects the first port 102 with the second port 104. The relay drive circuit 110 controls the position of the movable armature responsive to, for example, a received control signal. The received control signal may control a state of the switch 116. Closing the switch 116 induces a current in coil 112 that creates a magnetic field 114. The magnetic field 114 attracts the movable armature 108 to create a connection between the first port 102 and the second port 104. Opening the switch 116 disconnects the coil 112 from an external power source thereby causing the magnetic field 114 to decay. The decaying magnetic field induces a voltage across the coil 112 that causes the diode 118 to conduct. As the magnetic field 114 decays, the spring 106 pulls the movable armature 108 back to a first state that disconnects the first port 102 from the second port 104.

Example Relay Drive Circuits

As discussed above, electromagnetic relays may include various relay drive circuits (e.g., relay drive circuit 110) that controls the state of the movable armature (e.g., movable armature 108). FIG. 2A illustrates an embodiment of a relay drive circuit 200A for an electromagnetic relay. The relay drive circuit 200A includes a switch 202, a diode 204, and a coil 206 modeled as a resistor 208 in series with an inductor 210.

In one embodiment, the electromagnetic relay drive circuit 200A controls the movement of an armature within the relay via a magnetic field. The magnetic field is created by the coil 206, modeled as an inductor 210 in series with resistor 208. When the switch 202 is activated, a voltage is applied to the coil 206 thereby inducing a current in the inductor 210. The current in the inductor 210 creates a magnetic field that moves the armature from a first state to a second state. When the switch 202 is opened, the magnetic field from the inductor 210 collapses as the energy in the magnetic field is converted into a counter-electromotive force in the inductor. The counter-electromotive force is manifested as a voltage across the coil 206 with an inverted potential relative to the applied voltage. The voltage across the coil 206 causes the diode 204 to conduct and thereby drain energy from the inductor 210.

The strength of the magnetic field created by the coil 206 is directly related to the current in coil 206. The current i(t) in coil 206 decays after switch 202 has been opened at a rate consistent with the following equation:

$$i(t) = \frac{V_{DC}}{R_1} e^{\frac{-R_1}{L}t} \quad (1)$$

In equation (1), $V_{DC}$ is the voltage applied to the coil 206, $R_1$ is the value of the resistor 208 and L is the inductance of the inductor 210. The exponential decay of the current in the coil 206 represented by equation (1) is consistent with the following time constant equation:

$$\tau = \frac{L}{R_1} \quad (2)$$

The current in the coil 206 is near zero in approximately five time constants. As illustrated by equation (2), the characteristics of the coil 208 determine the rate at which the magnetic field decays.

Figure 2B:
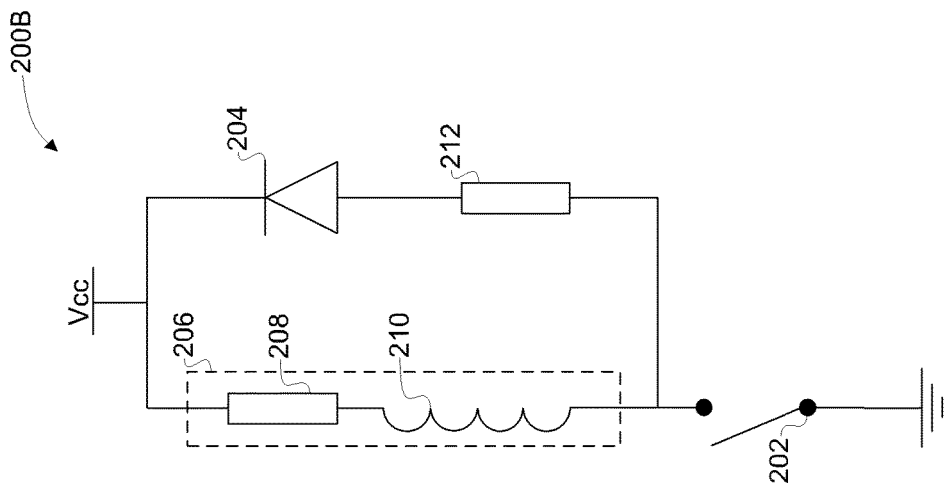
FIGS. 2A and 2B illustrate embodiments of a relay drive circuit.
Figure 2A:
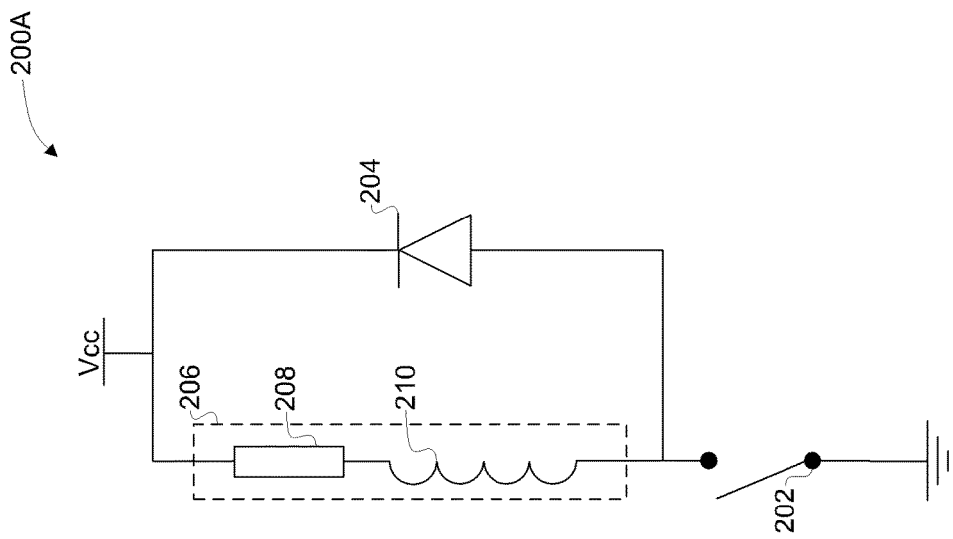

FIG. 2B illustrates another embodiment of an electromagnetic relay drive circuit 200B. The relay drive circuit 200B includes the switch 202, the diode 204, the coil 206 modeled as a resistor 208 in series with the inductor 210, and a resistor 212.

The relay drive circuit 200 illustrated in FIG. 2 includes an additional resistor 202 coupled in series with the diode 204. The additional resistor 202 changes the rate at which current decays in coil 206 consistent with the following equation:

$$i(t) = \frac{V_{DC}}{R_1} e^{\frac{-(R_1+R_2)}{L_2}t} \quad (3)$$

In equation (3), the value $V_{DC}$ the voltage applied to the coil 206 while $R_1$ is the resistance of the resistor 208, L is the inductance of the inductor 210, and $R_2$ is the value of the resistor 212. The exponential decay of the current in the coil 206 represented by equation (3) is consistent with the following time constant equation:

$$\tau = \frac{L}{R_1 + R_2} \quad (4)$$

In equation (4), $R_2$ is the resistance of resistor 212. Unlike the time constant represented in equation (2) for relay drive circuit 200A, the time constant in equation (4) can be reduced by increasing the resistance of resistor 212. However, increasing the resistance of resistor 212 also increases the voltage applied to the switch 202. The voltage $V_S$ across the switch in relay drive circuit 200B may be represented by the following equation:

$$V_S = R_2 \frac{V_{DC}}{R_1} e^{\frac{-(R_1+R_2)}{L}t} + V_{CC} \quad (5)$$

In equation (5), the value $V_{CC}$ is the voltage provided by the external power source while $V_{DC}$ is the voltage applied to the coil 206. As described in equation (5), the additional resistor 212 can substantially increase the voltage that the switch 202 needs to withstand during relay operation.

Example Quick Release Relay Drive Circuits

Figure 3:
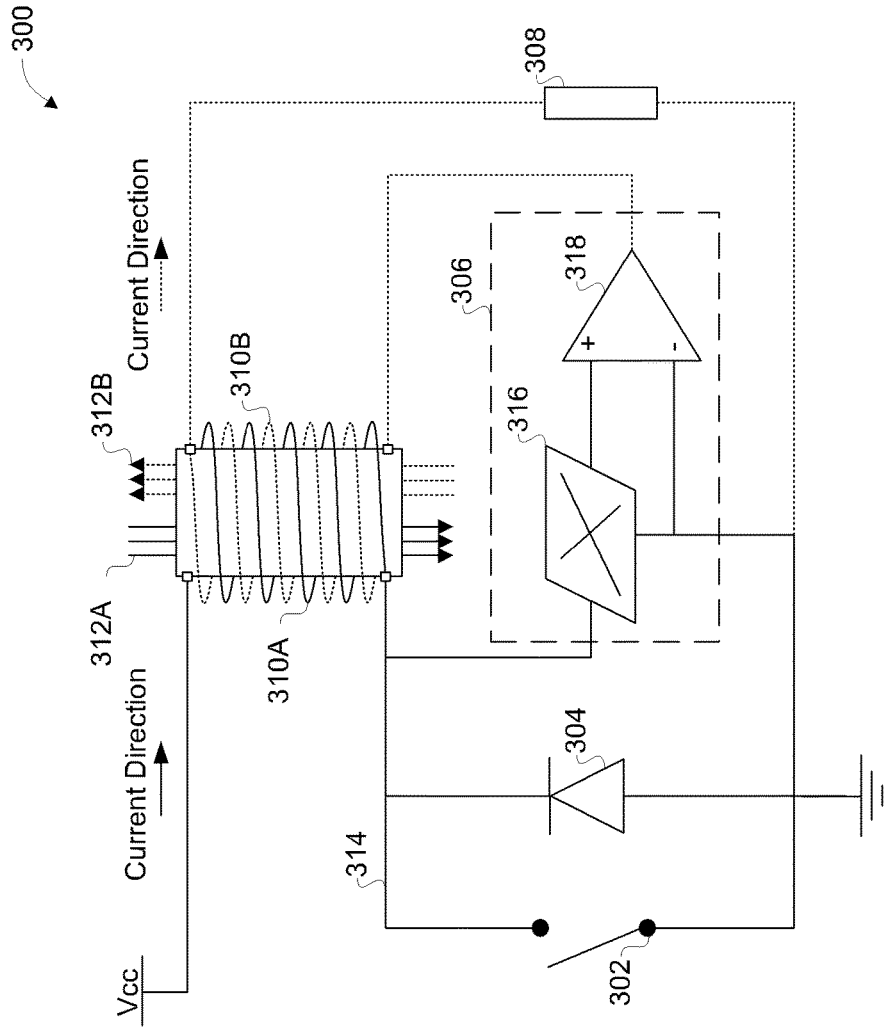
FIG. 3 illustrates an embodiment of a quick release drive circuit.

FIG. 3 illustrates an embodiment of a quick release relay drive circuit 300. The relay drive circuit 300 includes a switch 302, a diode 304, a coil control circuit 306 including a hall effect sensor 316 and a differential amplifier 318, a resistor 308, a first coil 310A that creates a first magnetic field 312A, a second coil 310B that creates a second magnetic field 312B, and a circuit node 314.

The first coil 310A creates a magnetic field 312A when switch 302 is closed. The magnetic field 312A moves the armature within the relay from a first state to a second state. The switch 302 may be any kind of circuit that performs a switching operation (i.e., a switch circuit). An example switch 302 includes, but is not limited to, an insulated-gate bipolar transistor (IGBT), a metal-oxide semiconductor field-effect transistor (MOSFET), or a silicon-controlled rectifier (SCR). The switch 302 may receive a voltage and/or current signal from an external source.

Opening switch 302 allows energy to drain from the coil 310A stored in the magnetic field 312A. The magnetic field 312A begins to collapse as energy from the magnetic field induces a voltage and thereby a current in the coil 310A. The reversed current direction in the coil 310A creates a higher voltage at the bottom end of the coil than at the top end of the coil (i.e., the voltage at node 314 is higher than Vcc). The induced voltage at node 314 is controlled by a diode 304.

The diode 304 may be, for example, a zener diode with a zener voltage at a higher value than Vcc (e.g., Vcc is 24 Volts and the zener voltage is 26 Volts) and thereby clamp the induced voltage to the zener voltage value.

The clamped voltage at node 314 may be utilized as an input to the coil control circuit 306. In relay drive circuit 300, the coil control circuit 306 utilizes the clamped voltage input as the power source for a hall effect sensor 316. The hall effect sensor 316 is activated by the presence of an external magnetic field (e.g., the decaying magnetic field 312A created by the first coil 310A). The hall effect sensor 316 outputs a hall voltage that is directly related to the strength of the sensed external magnetic field. The hall voltage output by the hall effect sensor 316 may be amplified by the differential amplifier 318 coupled to the hall effect sensor 314 output.

The output of the coil control circuit 306 is coupled to the second coil 310B. The voltage output by the coil control circuit 306 induces a current in the second coil 310B which induces a magnetic field 312B. The direction of the magnetic field 312B is opposite relative to the direction of the decaying magnetic field 312A. The strength of the total magnetic field is a linear combination of the magnetic fields 312A and 312B. Therefore, the total magnetic field (e.g., the summation of magnetic field 312A and 312B) is reduced by the creation of the second magnetic field 312B. The second magnetic field 312B causes the total magnetic field to collapse faster than simply allowing the magnetic field 312A to decay. The faster collapse of the total magnetic field enables a faster release time for the movable armature within the relay.

The amplified hall voltage output by the differential amplifier 316 is proportional to the total magnetic field from the first coil 310A and the second coil 310B. The current induced in the second coil 310B is slowly reduced as the total magnetic field collapses. The hall effect sensor 314 is deactivated when the switch 302 is closed to again change the state of the relay because the power input of the hall effect sensor at node 314 is coupled to ground.

Figure 4:
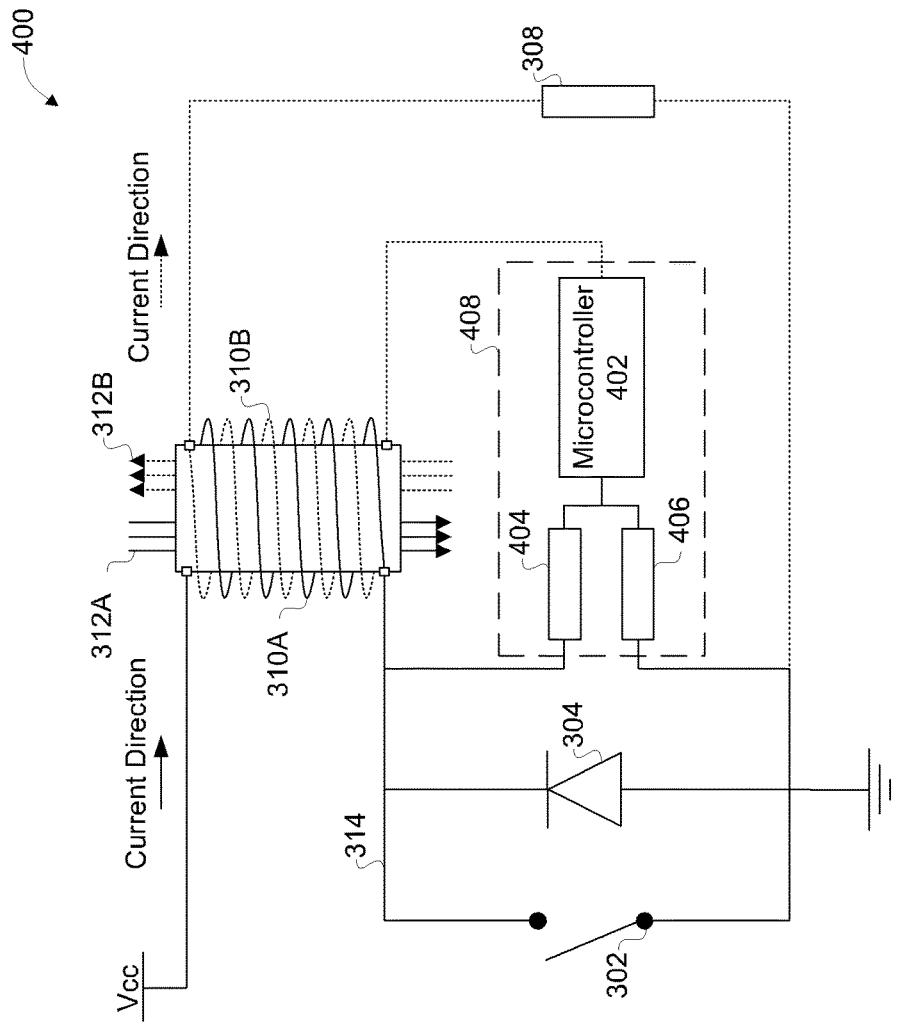
FIG. 4 illustrates another embodiment of a quick release relay drive circuit.

FIG. 4 illustrates another embodiment of a quick release relay drive circuit 400. The relay drive circuit 400 is similar to the relay drive circuit 300 and includes the switch 302, the diode 304, the first coil 310A that creates the first magnetic field 312A, the second coil 310B that creates the second magnetic field 312B, and the circuit node 314. The relay drive circuit 400 differs from the relay drive circuit 300 in that the coil control circuit 306 is replaced by a coil control circuit 408 that includes a microcontroller 402 and resistors 404 and 406.

The quick release relay drive circuit 400 illustrated in FIG. 4 utilizes a voltage divider circuit formed by resistors 404 and 406 in addition to the microcontroller 402 as the coil control circuit 408. As discussed above, a clamped voltage is induced at node 314 when the magnetic field 312A is decaying. The value of the voltage at the node 314 is proportional to the strength of the magnetic field in the primary coil. The microcontroller 402 measures a characteristic associated with the first coil 310A including, for example, the voltage at node 314 or a current through the first coil 310A. In one embodiment, the microcontroller 402 measures the voltage at node 314. In this embodiment, the voltage divider coupled between voltage node 314 and the microcontroller steps down the voltage level from node 314 to a lower level. The voltage step down may be required to reduce the voltage at node 314 to an acceptable level where the microcontroller can more accurately determine the voltage value. The microcontroller outputs a voltage value based on the measured voltage at node 314 to induce a current in the second coil 310B. For example, the microcontroller may multiply the measured voltage value by a gain to determine the output voltage value. As described above, inducing a current in the second coil 310B reduces the total magnetic field acting on the movable armature and thereby expedites the release of the movable armature.

Figure 5:
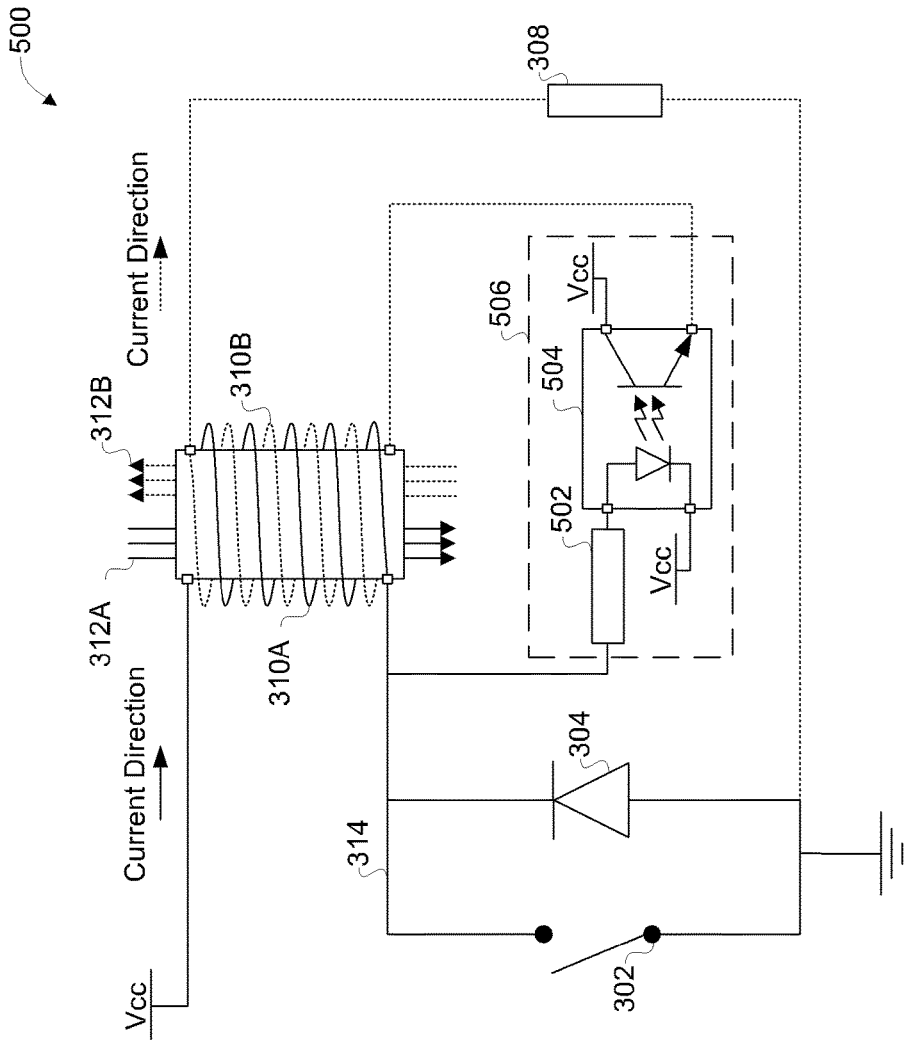
FIG. 5 illustrates another embodiment of a quick release relay drive circuit.
Figure 6:
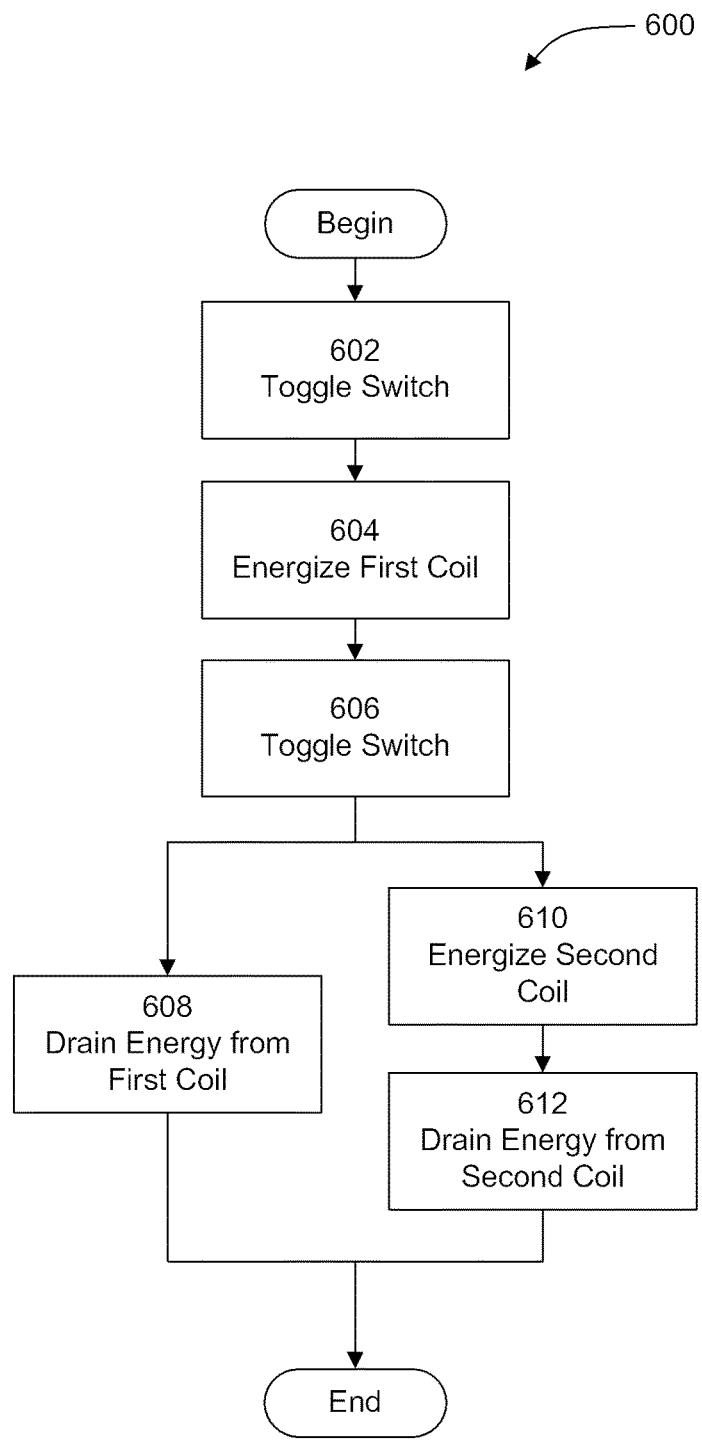
FIG. 6 illustrates an example method of operating a quick release relay.

FIG. 5 illustrates another embodiment of a quick release relay drive circuit 500. The relay drive circuit 500 is similar to the relay drive circuit 300 and includes the switch 302, the diode 304, the first coil 310A that creates the first magnetic field 312A, the second coil 310B that creates the second magnetic field 312B, and the circuit node 314. The relay drive circuit 500 differs from the relay drive circuit 300 in that the coil control circuit 306 is replaced by a coil control circuit 506 that includes a resistance 502 and an optocoupler 504.

The quick release relay drive circuit 500 illustrated in FIG. 5 utilizes a resistance 502 coupled to an optocoupler 504 as the coil control circuit 506. As described above, a clamped voltage is induced node 314 when the magnetic field 312A is decaying. The optocoupler 504 induces a current in the second coil 310B responsive to a characteristic of the first coil 310A including, for example, a voltage at node 314 or a current in coil 310A. In one embodiment, the optocoupler 504 induces a current in the second coil 310B based on the voltage at node 314. As the voltage at node 314 increases above Vcc, a current may induced in a light emitting diode (LED) of the optocoupler 504 causing light to be emitted. The light emitted by the LED is received by a phototransistor functioning as a variable resistance. As the phototransistor receives light, the variable resistance of the phototransistor is reduced. The reduced resistance of the phototransistor increases the voltage applied to the second coil 310B thereby inducing a current. As described above, inducing a current in the second coil 310B reduces the total magnetic field acting on the movable armature and thereby expedites the release of the movable armature.

Example Insulation Impedance Monitoring Processes

As described above with reference to FIGS. 3, 4, and 5, several embodiments decrease the release time in electromagnetic relays through the use of at least one secondary coil. Process 600 illustrates a method of operation for a quick release electromagnetic relay.

In act 602, the relay drive circuit toggles the switch from a first state to a second state. The relay drive circuit may receive a control signal from an external source that toggles the state of the switch. Toggling the switch from the first state to the second state causes a voltage to be applied to the first coil and thereby energize the first coil in act 604. The first coil creates a magnetic field that attracts the movable armature within the relay to, for example, connect or disconnect two electrical contacts.

In act 606, the relay drive circuit toggles the switch from the second state to the first state. Toggling the switch from the second state to the first state disconnects the first coil from a power source to begin draining energy from the first coil in act 608.

In act 610, the relay drive circuit energizes the second coil. The relay drive circuit may activate the second coil by applying a voltage to the coil responsive to the switch being toggled from the second state to the first state and the strength of the magnetic field. The strength of the magnetic field generated by the coils may be measured directly (e.g., by a hall effect sensor) or measured indirectly based on one or more voltage or current values of the relay drive circuit. As the magnetic field in the primary coil collapses, energy is slowly drained from the secondary coil in act 612 to maintain an approximately zero strength magnetic field at the movable armature.

Various aspects and functions described herein in accord with the present disclosure may be implemented as hardware, software, firmware or any combination thereof. Aspects in accord with the present disclosure may be implemented within methods, acts, systems, system elements and components using a variety of hardware, software or firmware configurations. Furthermore, aspects in accord with the present disclosure may be implemented as specially-programmed hardware and/or software.

Having thus described several aspects of at least one example, it is to be appreciated that various alterations, modifications, and improvements will readily occur to those skilled in the art. For instance, examples disclosed herein may also be used in other contexts including, for example, uninterruptable power supplies (UPS) or power distribution units (PDU). The electromagnetic relay drive circuit 110 may be constructed to operate with alternating current (AC) power. Any switch disclosed herein (e.g., switch 302 in FIGS. 3, 4, and 5) may be any circuit that performs a switching operation. In addition, any resistor disclosed herein may be replaced by one or more resistive circuit elements. Such alterations, modifications, and improvements are intended to be part of this disclosure, and are intended to be within the scope of the examples discussed herein. Accordingly, the foregoing description and drawings are by way of example only.

What is claimed is:

1. An electromagnetic relay comprising:
a first port and a second port;
a first coil and a second coil;
a movable armature coupled between the first port and the second port, the movable armature having a first state that connects the first port to the second port and a second state that disconnects the first port from the second port;
a switch circuit coupled to the first coil, the switch circuit having a first state constructed to connect the first coil to an external power source to induce the first coil to create a first magnetic field having a first direction and a second state constructed to disconnect the first coil from the external power source; and
a coil control circuit coupled to the first coil and the second coil and constructed to induce the second coil to create a second magnetic field having a second direction responsive to the switch circuit being in the second state, the second direction being opposite the first direction.

2. The electromagnetic relay of claim 1, wherein the electromagnetic relay is constructed such that the first magnetic field attracts the movable armature to move from the first state to the second state and the second magnetic field repels the movable armature to move from the second state to the first state.

3. The electromagnetic relay of claim 1, further comprising a ferrite core, and wherein the first coil and the second coil are wrapped around a ferrite core.

4. The electromagnetic relay of claim 1, wherein the coil control circuit comprises a hall effect sensor constructed to determine the strength of the first magnetic field and the second magnetic field created by the first coil and the second coil respectively.

5. The electromagnetic relay of claim 4, wherein the coil control circuit further comprises a differential amplifier coupled to the coil control circuit.

6. The electromagnetic relay of claim 1, wherein the coil control circuit comprises a microcontroller constructed to determine a characteristic associated with the first coil and induce the second coil to create the second magnetic field.

7. The electromagnetic relay of claim 6, wherein the coil control circuit further comprises a voltage divider circuit coupled between an input of the microcontroller and the first coil.

8. The electromagnetic relay of claim 1, wherein the coil control circuit comprises an optocoupler.

9. The electromagnetic relay of claim 1, wherein the electromagnetic relay is contained within in an automatic transfer switch (ATS).

10. The electromagnetic relay of claim 1, wherein the electromagnetic relay is contained within at least one of an uninterruptable power supply (UPS) and a power distribution unit (PDU).

11. A method of operating an electromagnetic relay having a first coil and a second coil, the method comprising:
connecting the first coil to an external power source to induce the first coil to create a first magnetic field having a first direction;
moving a movable armature from a first state to a second state at least in part by the first magnetic field;
disconnecting the first coil from the external power source; and
inducing the second coil to create a second magnetic field having a second direction opposite the first direction, the second magnetic field releasing the movable armature from the second state back to the first state.

12. The method of claim 11, wherein inducing the second coil to create the second magnetic field includes sensing a combined strength of the first magnetic field and the second magnetic field.

13. The method of claim 12, wherein inducing the second coil to create the second magnetic field further includes amplifying a voltage signal output by a hall effect sensor.

14. The method of claim 11, wherein inducing the second coil to create the second magnetic field includes determining a characteristic associated with the first coil.

15. The method of claim 14, wherein inducing the second coil to create the second magnetic field includes applying a voltage to the second coil responsive to the determined characteristic associated with the first coil.

16. The method of claim 14, wherein inducing the second coil to create the second magnetic field includes controlling a variable resistance coupled to the second coil responsive to the determined characteristic associated with the first coil.

17. An electromagnetic relay comprising:
a first port and a second port;
a first coil and a second coil;
a movable armature coupled between the first port and the second port, the movable armature having a first state that connects the first port to the second port and a second state that disconnects the first port from the second port;
a switch circuit coupled to the first coil, the switch circuit having a first state constructed to connect the first coil to an external power source to induce the first coil to create a first magnetic field having a first direction and a second state constructed to disconnect the first coil from the external power source; and
means, coupled to the first coil and the second coil, for inducing the second coil to create a second magnetic field having a second direction responsive to the switch circuit being in the second state, the second direction being opposite the first direction.

18. The electromagnetic relay of claim 17, wherein the means for inducing the second coil to create a second magnetic field includes a hall effect sensor.

19. The electromagnetic relay of claim 17, wherein the means for inducing the second coil to create a second magnetic field includes a microcontroller.

20. The electromagnetic relay of claim 17, wherein the means for inducing the second coil to create a second magnetic field includes an optocoupler.

\* \* \* \* \*